United States Patent
Fulop et al.

(10) Patent No.: US 12,183,091 B2
(45) Date of Patent: Dec. 31, 2024

(54) VEHICLE OCCUPANT MONITORING SYSTEM AND METHOD

(71) Applicant: Tobii Technologies Limited, Galway (IE)

(72) Inventors: Szaboles Fulop, Brasov (RU); Dragos Dinu, Brasov (RO); Radu Ene, Brasov (RO)

(73) Assignee: Tobii Technologies Limited, Galway (IE)

( * ) Notice: Subject to any disclaimer, the term of this patent is extended or adjusted under 35 U.S.C. 154(b) by 257 days.

(21) Appl. No.: 17/364,749

(22) Filed: Jun. 30, 2021

(65) Prior Publication Data

US 2023/0004745 A1  Jan. 5, 2023

(51) Int. Cl.
*G06V 20/59* (2022.01)
*B60W 40/08* (2012.01)
(Continued)

(52) U.S. Cl.
CPC ............ *G06V 20/59* (2022.01); *B60W 40/08* (2013.01); *G06F 18/21* (2023.01); *G06F 18/24* (2023.01);
(Continued)

(58) Field of Classification Search
CPC .... G06V 20/59; G06V 10/147; G06V 40/107; G06V 40/161; G06V 40/28;
(Continued)

(56) References Cited

U.S. PATENT DOCUMENTS

2014/0313309 A1* 10/2014 Matsuo ............... A61B 5/01
  348/78
2016/0107644 A1* 4/2016 Eigel ................. B62D 15/0265
  701/70

(Continued)

FOREIGN PATENT DOCUMENTS

| EP | 3580691 A2 | 6/2020 |
| EP | 3796209 A1 | 3/2021 |
| WO | 2020/084467 A1 | 4/2020 |

OTHER PUBLICATIONS

Behera, Ardhendu, Alexander Keidel, and Bappaditya Debnath. "Context-driven multi-stream LSTM (M-LSTM) for recognizing fine-grained activity of drivers." German Conference on Pattern Recognition. Cham: Springer International Publishing, 2018. (Year: 2018).*

(Continued)

*Primary Examiner* — Amandeep Saini
*Assistant Examiner* — Denise G Alfonso
(74) *Attorney, Agent, or Firm* — Christopher Ignatius Moylan

(57) ABSTRACT

A method for monitoring occupants of a vehicle comprises identifying a respective body region for one or more occupants of the vehicle within an obtained image; identifying within the body regions, skeletal points including points on an arm of a body; identifying one or more hand regions; and determining a hand region to be either a left or a right hand of an occupant in accordance with its spatial relationship with identified skeletal points of the body region of an occupant. The left or right hand region for the occupant are provided to a pair of classifiers to provide an activity classification for the occupant, a first classifier being trained with images of hands of occupants in states where objects involved are not visible and a second classifier being trained (Continued)

with images of occupants in the states where the objects are visible in at least one hand region.

18 Claims, 5 Drawing Sheets

(51) Int. Cl.
| | |
|---|---|
| *G06F 18/21* | (2023.01) |
| *G06F 18/24* | (2023.01) |
| *G06N 3/045* | (2023.01) |
| *G06T 3/40* | (2006.01) |
| *G06T 7/70* | (2017.01) |
| *G06V 10/147* | (2022.01) |
| *G06V 10/22* | (2022.01) |
| *G06V 40/10* | (2022.01) |
| *G06V 40/16* | (2022.01) |
| *G06V 40/20* | (2022.01) |

(52) U.S. Cl.
CPC .............. *G06N 3/045* (2023.01); *G06T 3/40* (2013.01); *G06T 7/70* (2017.01); *G06V 10/147* (2022.01); *G06V 10/22* (2022.01); *G06V 40/107* (2022.01); *G06V 40/161* (2022.01); *G06V 40/28* (2022.01); *B60W 2420/40* (2013.01); *B60W 2420/403* (2013.01); *B60W 2540/221* (2020.02); *B60W 2540/223* (2020.02); *B60W 2540/229* (2020.02); *G06T 2207/10048* (2013.01); *G06T 2207/20084* (2013.01); *G06T 2207/30196* (2013.01); *G06T 2207/30268* (2013.01)

(58) Field of Classification Search
CPC ... G06V 40/103; G06V 20/597; B60W 40/08; B60W 2420/40; B60W 2420/42; B60W 2540/223; B60W 2540/229; G06F 18/21; G06F 18/24; G06T 7/70; G06T 2207/20084; G06T 2207/30196; G06T 2207/30268
See application file for complete search history.

(56) References Cited

U.S. PATENT DOCUMENTS

| | | | |
|---|---|---|---|
| 2019/0213406 A1* | 7/2019 | Porikli | .................. G06V 20/597 |
| 2021/0056701 A1 | 2/2021 | Vranceanu et al. | |
| 2021/0081689 A1* | 3/2021 | Weyers | .................... G06N 3/02 |
| 2022/0284716 A1* | 9/2022 | Tanaka | ................. G06V 40/103 |
| 2024/0034362 A1* | 2/2024 | Oba | ...................... B60W 50/14 |

OTHER PUBLICATIONS

Odetallah, Amjad D., and Sos S. Agaian. "Human visual system-based smoking event detection." Mobile Multimedia/Image Processing, Security, and Applications 2012. vol. 8406. SPIE, 2012. (Year: 2012).*

Baek, Seungryul, Kwang In Kim, and Tae-Kyun Kim. "Weakly-supervised domain adaptation via gan and mesh model for estimating 3d hand poses interacting objects." Proceedings of the IEEE/CVF Conference on Computer Vision and Pattern Recognition. 2020. (Year: 2020).*

He, Li, and Jie Zhang. "Railway driver behavior recognition system based on deep learning algorithm." 2021 4th International Conference on Artificial Intelligence and Big Data (ICAIBD). IEEE, 2021. (Year: 2021).*

Ning, Guanghan, et al. "A top-down approach to articulated human pose estimation and tracking." Proceedings of the European Conference on Computer Vision (ECCV) Workshops. 2018. (Year: 2018).*

Natraj, N. A., and S. Bhavani. "Drivers' Real-Time Drowsiness Identification Using Facial Features and Automatic Vehicle Speed Control." International Journal of Computer Communication and Informatics 3.1 (2021): 44-52. (Year: 2021).*

Patrick Weyers et al., "Action and Object Interaction Recognition for Driver Activity Classification", 2019 IEEE Intelligent Transportation Systems Conference (ITSC) Auckland, NZ, Oct. 27-30, 2019, pp. 4336-4341.

Sehyun Chun et al., "NADS-Net: A Nimble Architecture for Driver and Seat Belt Detection via Convolutional Neural Networks", arXiv:1910.03695, 9 pages.

Guillermo Garcia-Hernando et al., "First-Person Hand Action Benchmark with RGB-D Videos and 3D Hand Pose Annotations", CVPR 2018, pp. 409-419.

Cian, Ryan, et al. International Application No. PCT/EP2021/058973 Filed Apr. 6, 2021, entitled "Object Detection for Event Cameras," 62 pages.

Zaharia, Corneliu, et al. International Application No. PCT/EP2021/066440 Filed Jun. 17, 2021, entitled "Event Camera Hardware," 24 pages.

Elings, Jannes W., "Driver Handheld Cell Phone Usage Detection", (Sep. 2018), Master's Thesis Utrecht University, XP055620856. 56 pgs.

Extended European Search Report for Application No. 23194610.4 dated Nov. 22, 2023. 10 pgs.

* cited by examiner

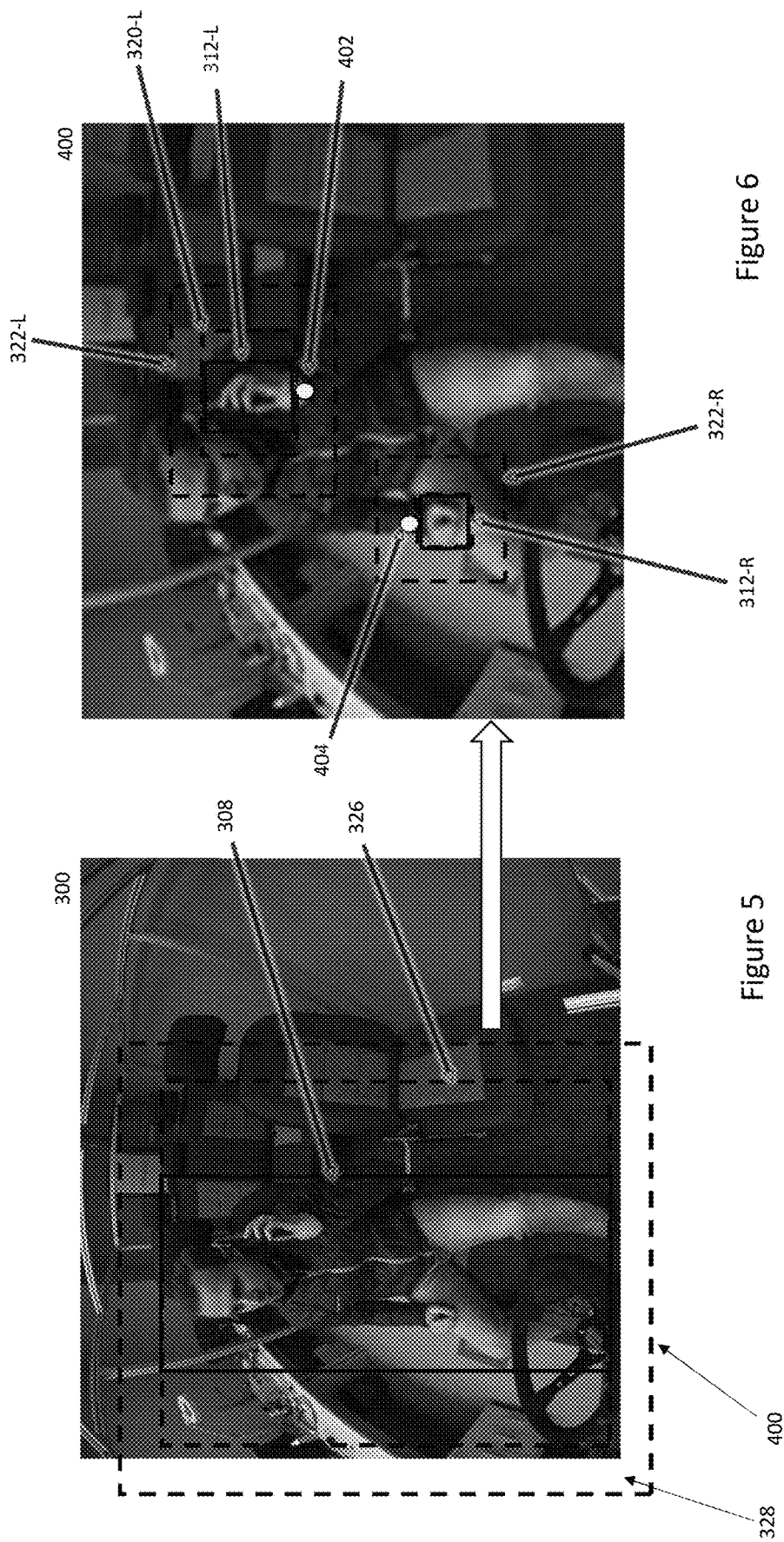

VEHICLE OCCUPANT MONITORING SYSTEM AND METHOD

FIELD

The present invention relates to a vehicle occupant monitoring system and method.

BACKGROUND

Referring now to FIG. 1, vehicle occupant monitoring systems typically comprise an image acquisition device 104 mounted in a cabin 110 of a vehicle in which one or more occupants 108, 112 are seated within the field of view 114 of the camera. In FIG. 1, two occupants 108, 112 are shown in front seats of the vehicle, with the image acquisition device 104 located forwardly and facing rearwardly. It will be appreciated that other occupants of the vehicle including back seat passengers (not shown) may also appear within the field of view 114 of the camera 104.

FIG. 2 shows a typical image 200 acquired by the image acquisition device 104 where it will be seen that occupant 108 is the driver of the vehicle, while occupant 112 is a passenger.

It is desirable and indeed future vehicle safety standards are based on being able to identify the activity of the occupants at any given time, especially to determine if any of these endanger the safe driving of the vehicle, for example, in the case of semi/fully autonomous cars, to determine if the person sitting behind the wheel is able to take control of the vehicle (if needed).

Patrick Weyers et al, "Action and Object Interaction Recognition for Driver Activity Classification", 2019 IEEE Intelligent Transportation Systems Conference (ITSC) Auckland, NZ, Oct. 27-30, 2019 discloses a driver monitoring system where in a first stage, body key points of the driver are localised and in a second stage, image regions around the localized hands are extracted. These regions and the determined 3D body key points are used as the input to a recurrent neural network for driver activity recognition.

Sehyun Chun et al, "NADS-Net: A Nimble Architecture for Driver and Seat Belt Detection via Convolutional Neural Networks", arXiv:1910.03695 utilizes a feature pyramid network (FPN) backbone with multiple detection heads for driver/passenger state detection tasks.

Guillermo Garcia-Hernando et al, "First-Person Hand Action Benchmark with RGB-D Videos and 3D Hand Pose Annotations", CVPR 2018, discloses using of 3D hand poses to recognize first-person dynamic hand actions interacting with 3D objects.

SUMMARY

According to a first aspect of the present invention, there is provided a method according to claim 1.

According to a second aspect, there is provided a method according to claim 15.

In further aspects, there are provided vehicle occupant monitoring systems and computer program products for implementing methods according to the invention.

Embodiments of the invention identify an occupant state which may be closely related to the occupant handling an object, without explicitly identifying the object.

BRIEF DESCRIPTION OF THE DRAWINGS

An embodiment of the invention will now be described, by way of example, with reference to the accompanying drawings, in which:

FIGS. 5 and 6 illustrate the expansion of detected body and hand regions before being provided to the skeleton detector and classifiers of FIG. 3.

DESCRIPTION

Figure 3:
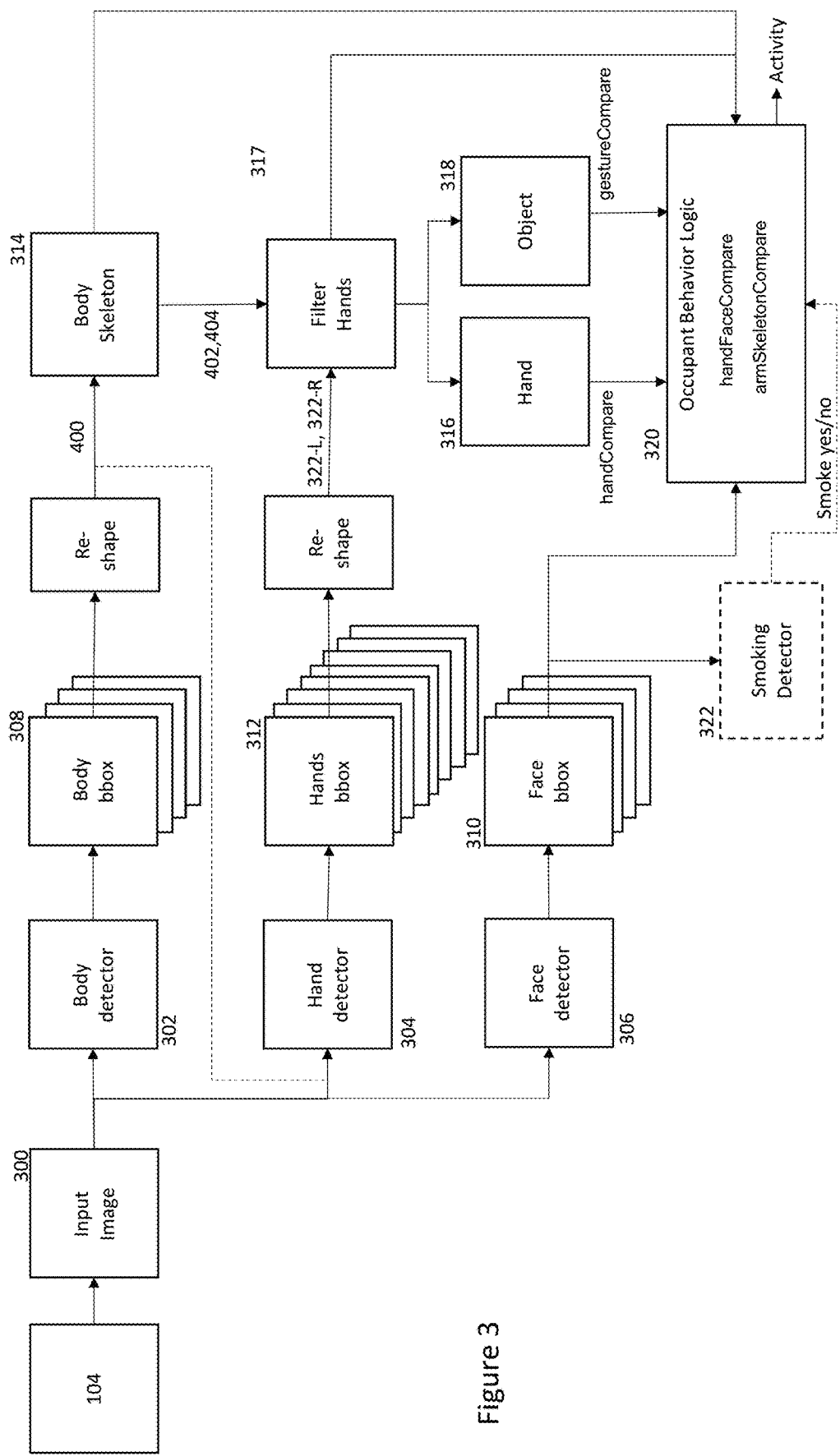
FIG. 3 is a schematic diagram of the components of the vehicle occupant monitoring system according to an embodiment of the present invention.

Referring now to FIG. 3, a vehicle occupant monitoring system according to an embodiment of the present invention acquires successive images 300 from an image acquisition device 104 mounted in a cabin 110 of the vehicle.

The image acquisition device 104 can comprise any of: a visible wavelength color camera with RGB pixels, an infra-red (IR) camera, a camera including a Bayer array of pixels including R,G,B and IR sensitive pixels or a thermal camera. Alternatively, the camera could comprise a monochrome, for example, green sensitive, camera. In a still further alternative, the image acquisition device 104 could comprise an event camera of the type described in PCT Application No. PCT/EP2021/058973 (Ref: FN-675-PCT), the disclosure of which is incorporated herein by reference, where event information is accumulated in a tensor before being provided to downstream classifiers. Again, the pixels of such a camera can be sensitive to any of visible, infra-red or thermal radiation. As disclosed in PCT/EP2021/066440 (Ref: FN-668-PCT), the disclosure of which is herein incorporated by reference, dedicated hardware can be provided to produce such an image tensor from event camera information. In a still further alternative, the image acquisition device 104 could comprise a combined frame based and event camera such as a Davis 346 camera available at iniVation.com.

It will also be appreciated that it is possible to swap between IR images and visible wavelength image source in accordance with a measured ambient light level of the vehicle cabin.

In a typical implementation, the camera comprises a 1600×1300 array of pixels. However, this is typically not sufficient to be able to explicitly identify the various objects which an occupant may have in their hands, and which can signal their current activity—especially for back seat occupants who appear significantly smaller than front seat occupants and so would require even greater camera resolution in order to classify their activity through explicitly identifying objects in their hand. Also, for example, while identifying a cigarette can indicate that an occupant is smoking, identifying any one of a number of foodstuffs can indicate that an occupant is eating, and identifying a phone may indicate that an occupant is either talking on the phone without using hands-free mode or texting or otherwise interacting with their phone, this approach may often not produce satisfactory or reliable results. For example, objects may be held in an occupant's hand in a manner where most of the object is occluded.

In embodiments of the present invention camera image information is downsampled to QVGA resolution, i.e. 320×

240, before being provided to respective a body detector 302, hand detector 304 and face detector 306.

Figure 1:
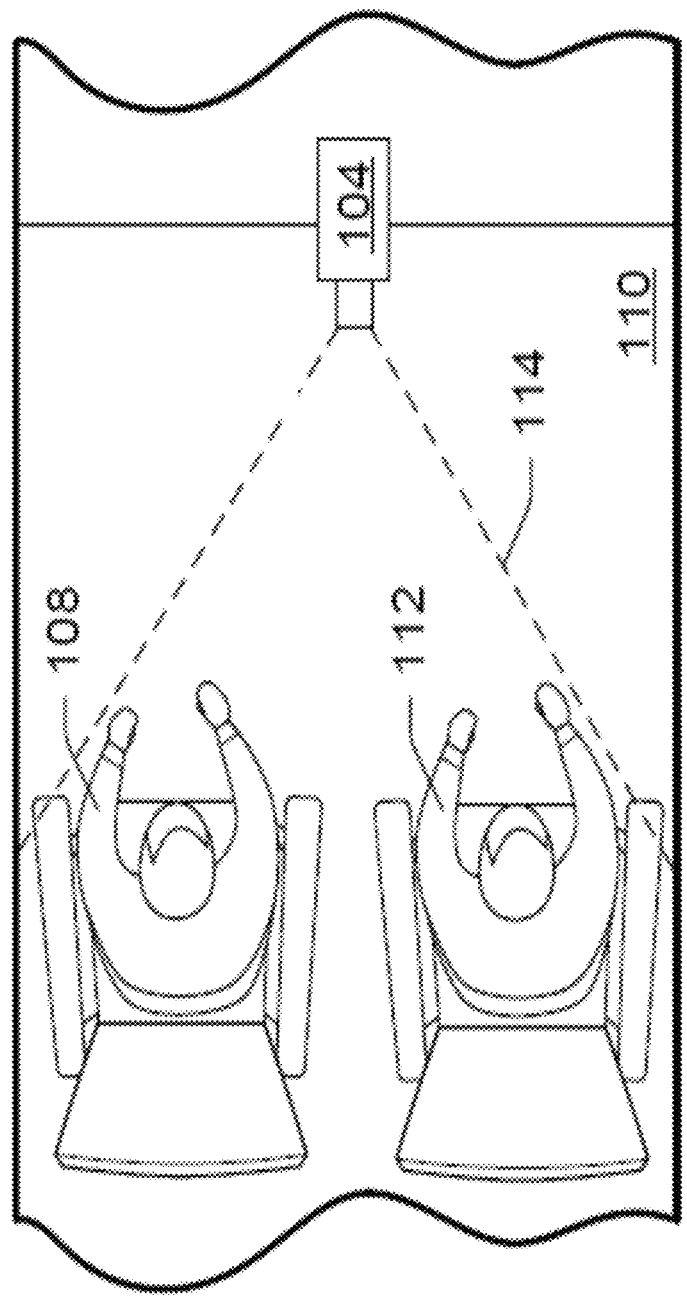
FIG. 1 shows schematically a cabin of a vehicle including a number of occupants as well as an image acquisition device for a vehicle occupant monitoring system according to an embodiment of the present invention.
Figure 2:
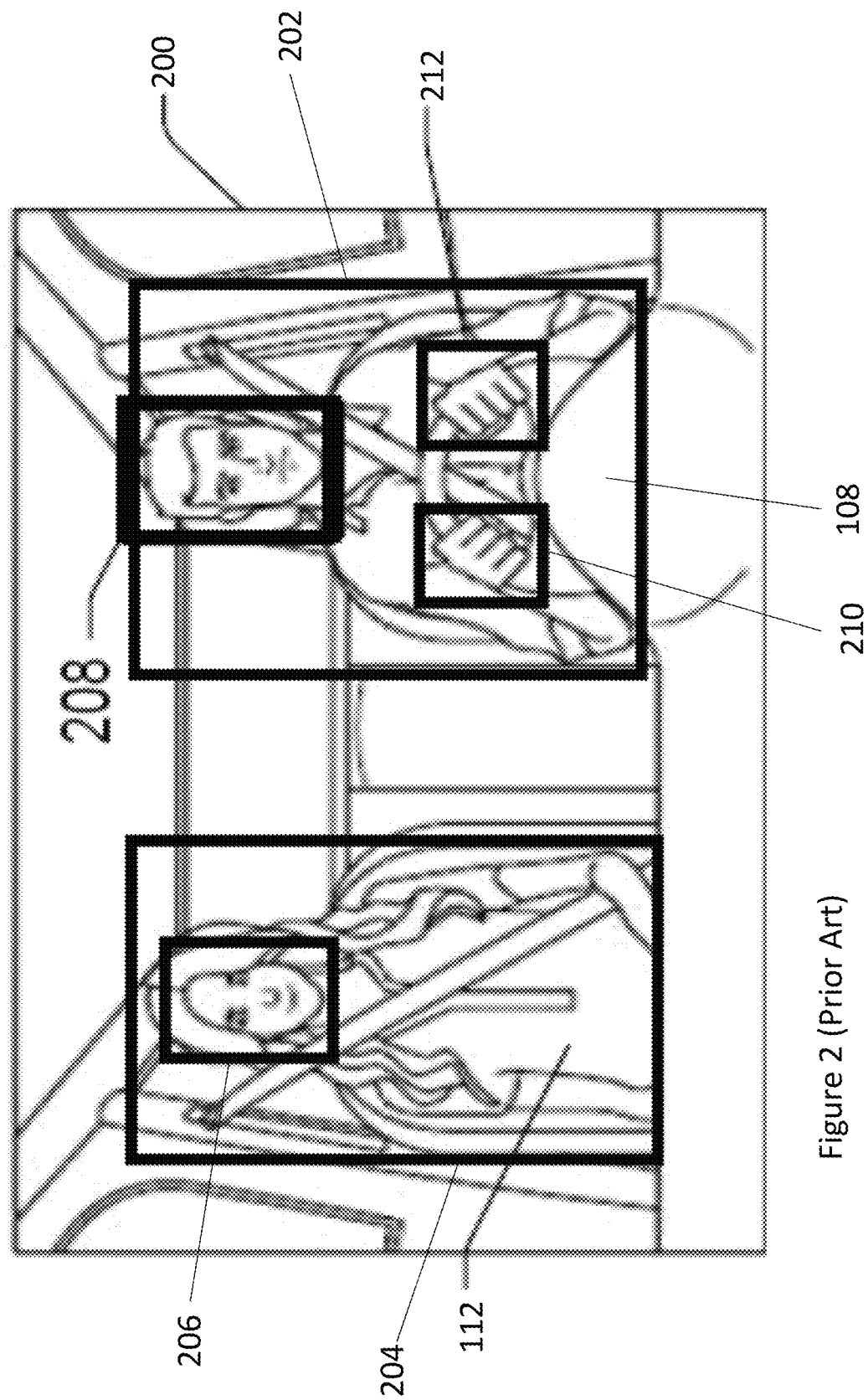
FIG. 2 illustrates body, face and hand regions detected within the field of view of the image acquisition device of FIG. 1.

The body detector 302 is configured to identify one or more regions of the image bounding a human body. In FIG. 2, the region 202 has been identified as bounding the driver 108 and the region 204 has been identified as bounding the passenger 112. Similarly the face detector 306 identifies regions 206 and 208 bounding the faces of the passenger 112 and driver 108 respectively. Finally, the hand detector 304 identifies hand regions 210 and 212.

It will be appreciated that any suitable forms of detectors can be employed ranging from classical Haar type detectors to neural network based detectors. In the case of neural network detectors, networks with similar or identical structures, but trained to use different weights can be used for each of the body detector 302, hand detector 304 and face detector 306. These detectors can be run serially, where the intermediate or final output of one may boost the performance of another, or in parallel in particular using a multi-core neural network processor of the type disclosed in European Patent Nos. EP 3580691 (Ref: FN-618-EP) and EP 3668015 (Ref: FN-636-EP), the disclosures of which are incorporated herein by reference.

Typically, such networks will produce a set of confidence levels for bounding boxes at different scales and proportions at respective locations across the image. In some embodiments, up to 4 mutually exclusive bounding boxes 308 with confidence levels above a threshold amount will be chosen as body regions. Thus, for each body region, an x,y location of its origin within the image, along with a width and height and a confidence level for the body region will be provided from the body detector 304.

Similarly, up to 4 mutually exclusive bounding boxes with confidence levels above a threshold amount will be chosen as face regions 310. Thus, for each face region, an x,y location of its origin within the image, along with a width and height and a confidence level for the face region will be provided from the face detector 308.

Finally, up to 8 mutually exclusive bounding boxes 312 with confidence levels above a threshold amount will be chosen as hand regions. Again, for each hand region, an x,y location of its origin within the image, along with a width and height and a confidence level for the hand region will be provided from the hand detector 304.

It will be understood that where it is possible for there to be fewer or more occupants of a vehicle, the maximum number of body, face and hand boxes can be varied accordingly.

In the embodiment, each bounding box 308 for a body region is provided to a body skeleton detector 314. When such a detector is implemented with a neural network, it typically requires its input image to be normalised. In the illustrated embodiment, the input image map for the skeleton detector 314 is 192×192 pixels. Given that the input image for the body detector 302 comprises only 320×240 pixels, it is most likely that a detected body region 308 will be smaller than this size and typically will have a width less than its height. However, rather than scaling and resizing the detected bounding box 308 directly, in the embodiment, the system first re-shapes the body region, by expanding the width of body region to provide an expanded square region 326 centered around the originally detected body region 308. The re-shaped body region can then be expanded to comprise a region 400 of 192×192 pixels corresponding to the input map size of the skeleton detector 314. It will be appreciated that the re-shaping and the expansion may mean that the boundary of the body region extends beyond the boundary of the input image 300—such regions 328 can be simply treated as blank. Nonetheless, the increased image area provided around the detected body region 308 can provide the skeleton detector 314 with improved context with which to make its inference.

Figure 4:
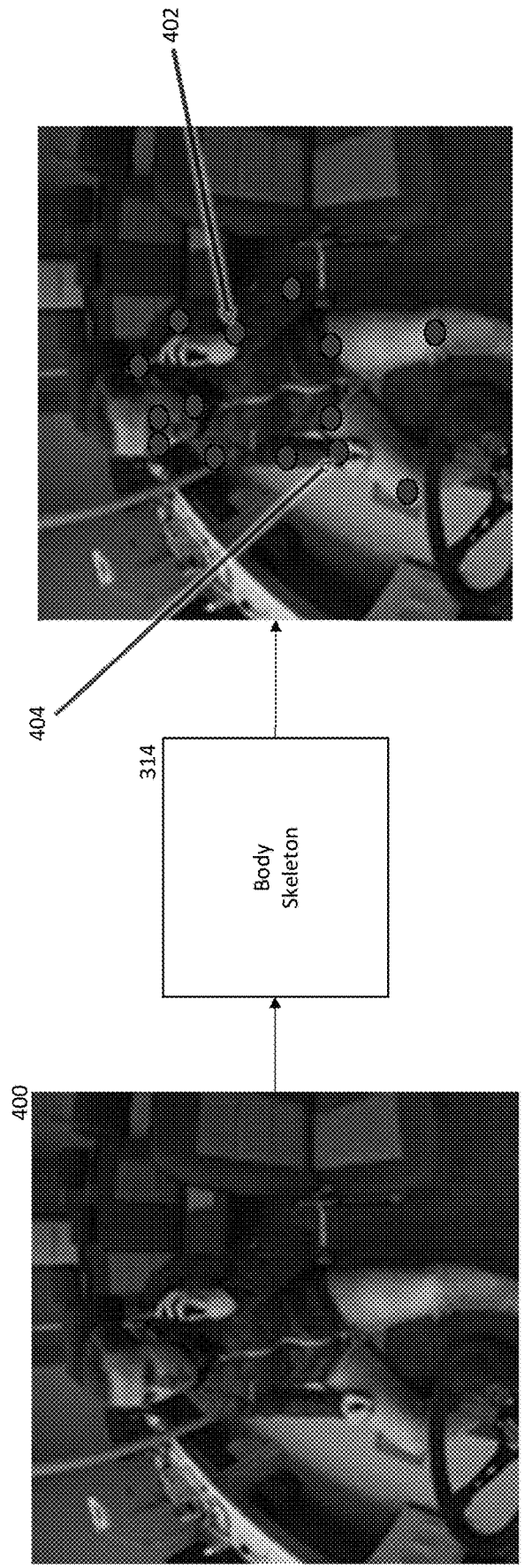
FIG. 4 illustrates the output provided by a skeleton detector of FIG. 3.

Referring now to FIG. 4, conventional skeleton detectors 314 typically provide at their output a respective heat map for each joint to be identified with the peak value in each heat map generally indicating the location of the associated joint. These results can be filtered and analysed to the extent required, but in essence, an image crop 400 from the input image 300 corresponding to a re-shaped and expanded bounding box from the body detector 302 can be used to provide a set of x,y locations within the input image for each one a number of joints of the body region of interest. Note that, as per US-2021-0056701 (Ref: FN-651-US), the disclosure of which is incorporated herein by reference, the x,y locations for joints do not necessarily need to fall within the area of the re-shaped and expanded bounding box and some locations for joints can be inferred, even if they are not visible within the image crop 400.

As will be seen, in the present embodiment, two joints in particular are of interest and these are the left 402 and right 404 wrists of the occupant.

Referring back to FIG. 3, in the embodiment, a hand filter 317 looks at the bounding boxes 312 for each hand identified by the hand detector 304 and associates a hand bounding box 312 nearest and/or most overlapping a wrist location 402, 404 as the left or right hand region corresponding to the body.

It should also be noted, as shown in FIG. 6, that rather than searching the input image 300 for all hand regions in one pass, it is also possible to use the expanded image crop 400 around each body region 308 as an input image for respective instances of the hand detector 304. Now any hand regions that are detected within each input image crop 400 are automatically associated with the body from which the image crop 400 is derived. Again nonetheless, a hand bounding box 312 nearest and/or most overlapping a wrist location 402, 404 is designated as the left 312-L or right 312-R hand region corresponding to the body.

Similarly, a face region 318 which most overlaps with a body region or which is closest or most overlaps with the eye sockets or chin locations identified by the skeleton detector 314 for a given body region can be treated as the face region corresponding to the identified body.

In the embodiment, pairs of left and right hand regions identified for a given body are fed to respective networks 316, 318 which will be described in more detail below. Again, these networks 316, 318 require their input images to be normalised. In the illustrated embodiment, each input image map for the networks 316, 318 is 128×128 pixels. Again, it is most likely that a detected hand region will be smaller than this size. Again, as with the detected body region(s), rather than scaling and resizing a detected bounding box 312 directly, in the embodiment, the system first re-shapes each hand region, by expanding the width of hand region, so that it comprises a square centered around the originally detected hand region, for example, region 320-L in FIG. 6. (In this case, hand region 312-R is already square and so this step can be skipped.) The re-shaped hand region is then expanded to comprise a region 322-L, 322-R of 128×128 pixels corresponding to the input map size of the networks 316, 318. Again, the increased image area provided around the detected hand region(s) can provide the networks 316, 318 with improved context with which to make their inference. It will also be appreciated that where no hand regions are associated with a given body, the networks 316, 318 will not be executed. However, when only one hand region is associated with a given body, one or both of the networks 316, 318 can be executed with the second hand region input being blank.

In the embodiment, each of the networks 316, 318 comprise identical structures and produce corresponding outputs, with each output corresponding to a user activity of concern, for example: smoking, eating, talking on the phone, texting.

However, the network 316 is trained with images of occupants involved in such activities where the objects involved in the activity, for example, a cigarette, food or a phone are not visible. On the other hand, the network 318 is trained with images of occupants involved in such activities where the objects are visible in at least one hand region of the input image.

As will be seen later, this allows the networks 316, 318 to provide improved inference because the appearance of a hand region during different activities tends to either show the hand or the object and so, rather than tending to provide an averaged output inference value when a hand region clearly shows a hand involved in an activity or an object indicative of an activity, in the present embodiment, in the first case when only an occupants hands are visible, network 316 should produce quite a high confidence level and the network 318 a low confidence level, whereas in the second case when an object is visible in at least one hand, network 318 should produce quite a high confidence level and the network 316 a lower confidence level.

In the embodiment, the output produced by the network 316 is labelled handCompare and qualified by the type of (unseen) object associated with the activity, e.g. cigarette, food, phone. The output produced by the network 318 is labelled gestureCompare and qualified by the type of visible object associated with the activity, again: cigarette, food, phone.

For each body region 308, each of the classifications produced by the networks 316, 318, the left/right hand inference produced by the hand filter 317, the skeleton data produced by the detector 314 and the location of the face region 310 are fed to occupant behaviour logic 320 to make a final classification of the activity for the occupant corresponding to the identified body region.

It will be understood that all of the above information can be produced from a single image (or image tensor) 300 from image acquisition device 104.

However, it will be appreciated, that inference made on previously acquired image information can also be used to improve the operation of the various modules within the system of FIG. 3.

Furthermore, other modules can also be employed with a view to determining user activity without necessarily and explicitly identifying an object indicative of the activity. For example, as is well known, a face region 310 for a body can be tracked from one image frame to the next. In one embodiment, a smoking detector 322 makes a simple contrast measurement on each instance of face region detected. It will be appreciated that when an occupant smokes, they will periodically exhale smoke and this tends to lower the contrast of the image in the region of their face during this period. When such a periodic fluctuation in contrast is detected, then the smoking detector 322 can signal that the occupant corresponding to the face region may be smoking.

The occupant behaviour logic 320 can now further process the information provided to generate further inferences about user activity.

In a first example, the logic 320 attempts to identify whether any arm of an occupant is in a V shape indicative of a user talking on a phone, smoking, eating or drinking. In order to do so, the logic 320 attempts to estimate a Euclidian distance between each of 3 skeleton points from the arm: (W)rist, (S)houlder, (E)lbow. The Euclidian distance (d) can be estimated from a single 2D image, especially taking into account that the approximate location and orientation of a body relative to the image acquisition device 104 is known. So if d(W, S)<d(S, E) and d(W, E), it can be inferred that the occupants arm is in a V shape. In such a case, a parameter armSkeletonCompare can be set to true for the occupant.

It will be appreciated that non-geometrical techniques can also be employed to determine if the occupant's arm is in a V shape including applying a dedicated neural network to the body region 308 or re-shaped and expanded body region 400.

In another example, the behaviour logic 320 may analyze the skeleton data to determine if an occupant's arm is in an L shape which can be indicative of a user interacting with their phone other than talking. When such an L shape is detected, a parameter similar to armSkeletonCompare can be set to true.

In the embodiment, another parameter which is determined by the behaviour logic 320 is based on detecting whether a hand region associated with a body overlaps or is closely adjacent the face region for a body. If so, a parameter handFaceCompare is set to true.

So, for any given frame, the behaviour logic 320 is provided by the networks 316, 318 with handCompare and gestureCompare values indicating a respective confidence levels for the various occupant activities being monitored for each occupant associated with a detected body region. In the embodiment, the behaviour logic 320 can analyse the skeleton joint locations to produce an indication, armSkeletonCompare, of whether one or more of the monitored occupant activities are true or not. Furthermore, in the embodiment, the behaviour logic 320 can analyse the spatial relationship of the hand and face regions to produce an indication, handFaceCompare, of an activity.

All of these parameters, as well as the current value of smoking provided by the smoking detector 322, when this is available, can be combined to produce a final value for the current activity of the occupant.

So, for example, if:

(handCompare == TRUE (for object_class == food or drink or phone));
or
gestureCompare == TRUE(for object_class == food or drink or phone));
and
handFaceCompare == TRUE; and
armSkeletonCompare == TRUE
then eating / drinking / talking on the phone is detected.

Thus, these behaviors are triggered only when the food/drink/phone is near the face, not just held in the hand.

In some embodiments, the behaviour logic 320 can wait until eating/drinking/talking on the phone is detected in more than a threshold number of frames within a pre-defined time window before flagging the behaviour.

In another example, if:

(handCompare == TRUE (for object_class == phone); or
gestureCompare == TRUE (for object_class == phone)) and
handFaceCompare == FALSE; and

```
armSkeletonCompare == FALSE.
  then texting is detected.
```

In this case, rather than using armSkeletonCompare as false, the value of the L shape skeleton detecting parameter being true could be used.

In any case, it will be seen how this behaviour is detected only when a phone is held in the hand, away from the face.

Again, the behaviour logic 320 can wait until this behaviour is detected in more than a threshold number of frames within a pre-defined time window before flagging the behaviour.

Further analysis of the skeleton points provided by the detector 314 can also be employed to detect other behaviours.

For example, the skeleton points (neck, left hip, right hip) can be used compute an upper body forward angle, where 0°-30° can indicate the occupant is bending down, while angles of approximately 90° indicate the occupant is upright.

If no hip skeleton points are detected, then the behaviour logic 320 can check if any of the head or shoulder skeleton points are located inside a "bending" region of the body region, for example, a lower 50% of the body region. If so, then bending down is detected.

It is also possible to check if the face region associated with a body region intersects the lower bending region of the body region and if so, bending down can be indicated.

These checks can also be combined and again the activity can be monitored so that if it is detected in more than a threshold number of frames within a pre-defined time window, the behaviour is flagged.

As well as determining activities from the instantaneous values of the above parameters and the instantaneous location of skeleton joints for a given frame, the behaviour logic 320 can also keep track of parameter values over time to determine an occupant activity. So again, in relation to bending, if the aspect ratio of the body region changes over time, with the height decreasing from a height for the body region when it was detected as upright, then this too can be used to indicate bending.

Once any particular occupant behaviour has been determined by the behaviour logic 320, especially, when this indicates unsafe behaviour on the part of the occupant, and especially the driver, this can be signalled to a vehicle controller. The indication can be used by for example, a vehicle Advanced Driver-Assistance System (ADAS) either to signal to the occupant that they should cease their behaviour or in some cases, to automatically control the vehicle and for example to reduce the vehicle speed to below a safety threshold.

The invention claimed is:

1. A method for monitoring occupants of a vehicle comprising:
   obtaining successive images of an interior cabin of the vehicle from an occupant facing camera;
   identifying one or more respective body bounding boxes for a body region for one or more occupants of said vehicle within an obtained image;
   determining confidence levels of each of the one or more respective body bounding boxes;
   select the one or more respective body bounding boxes with the confidence levels exceeding a predetermined confidence level as body regions;
   identifying within at least one of said body regions, based on the confidence levels, a plurality of skeletal points including one or more points on an arm of a body;
   identifying one or more face regions within said obtained image;
   identifying one or more hand regions within said obtained image;
   determining a hand region to be either a left or a right hand of an occupant in accordance with its spatial relationship with identified skeletal points of said body region of said occupant;
   determining a face region to be a face region of an occupant in accordance with its spatial relationship with said body region of said occupant;
   analysing a spatial relationship of a determined left or right hand region and a determined face region to provisionally determine a state of said occupant;
   providing at least said determined left or right hand region for said occupant to a classifier to provide an activity classification for said occupant, wherein said activity classification comprises a first classification for movements of the determined left or right hand regions with an object and a second classification for the movement of the determined left or right hand regions with the object not visible to the occupant facing camera;
   combining said provisional state of said occupant and said activity classification to provide a final state for said occupant; and
   automatically controlling a speed of the vehicle based on the final state for said occupant.

2. The method according to claim 1 comprising expanding around the or each determined left or right hand region within said obtained image to generate an expanded hand region of a shape and size corresponding to an input image shape and size of said classifier and providing said expanded hand region to said classifier.

3. The method according to claim 1 comprising expanding around the body region within said image to generate an expanded body region of a shape and size corresponding to an input image shape and size of a neural network for identifying said plurality of skeletal points of said body.

4. The method according to claim 3 wherein said neural network is configured to provide a heat map of potential locations for said skeletal points, the method further comprising filtering said heat map to provide final locations within said image for said skeletal points.

5. The method according to claim 1 wherein said occupant is one of: a driver; or a passenger of said vehicle.

6. The method of claim 1 wherein said skeletal points include: eye sockets, chin, ears, shoulders, elbows, wrists, hips and knees.

7. The method of claim 1 comprising identifying each of said body, face and hand regions using a neural network with a common architecture and with respective weights specific to each of said body, face and hands.

8. The method of claim 1 comprising swapping between visible and infra-red camera images in accordance with an ambient light level of said cabin.

9. The method of claim 1 further comprising: monitoring an identified face region through successively obtained images to make a provisional classification that said occupant is smoking; and combining said provisional classification that said occupant is smoking with said provisional state of said occupant and said activity classification to provide said final state for said occupant.

10. The method of claim 9 wherein said monitoring comprises: monitoring a contrast level of said identified face region through successively obtained images; and analyzing changes in said contrast level over time to make said provisional classification that said occupant is smoking.

11. The method of claim 1 wherein said classifier comprises a pair of classifiers, a first being trained with images of hands of occupants in states where objects involved are not visible and a second trained with images of occupants in said states where the objects are visible in at least one hand region.

12. The method of claim 11 wherein said pair of classifiers comprise identical structures and produce corresponding outputs.

13. The method of claim 1 wherein said states include: smoking, eating, drinking, talking on the phone and texting.

14. The method of claim 1 further comprising analysing the respective locations of skeletal points to provide a further provisional determination of an occupant activity.

15. A method for monitoring occupants of a vehicle comprising:
   obtaining successive images of an interior cabin of the vehicle from an occupant facing camera;
   identifying one or more respective body bounding boxes for a body region for one or more occupants of said vehicle within an obtained image;
   determining confidence levels of each of the one or more respective body bounding boxes;
   selecting the one or more respective body bounding boxes with the confidence levels exceeding a predetermined confidence level as body regions;
   identifying within at least one of said body regions, based on the confidence levels, a plurality of skeletal points including one or more points on an arm of a body;
   identifying one or more hand regions within said obtained image;
   determining a hand region to be either a left or a right hand of an occupant in accordance with its spatial relationship with identified skeletal points of said body region of said occupant;
   providing at least said determined left or right hand region for said occupant to a pair of classifiers to provide an activity classification for said occupant, wherein said activity classification comprises a first classification for movements of the determined left or right hand regions with an object and a second classification for the movement of the determined left or right hand regions with the object not visible to the occupant facing camera; and
   automatically controlling a speed of the vehicle based on the activity classification for said occupant.

16. The method of claim 15 wherein said pair of classifiers comprise identical structures and produce corresponding outputs.

17. An occupant monitoring system for a vehicle comprising at least one image acquisition device configured to acquire successive images of an interior cabin of the vehicle with an occupant facing camera; and a processor configured to perform the steps of claim 1.

18. A computer program product comprising a non-transitory computer readable medium on which instructions are stored which when executed on a processor of an occupant monitoring system for a vehicle are configured to perform the steps of claim 1.

* * * * *